United States Patent
Kang et al.

(10) Patent No.: US 9,906,246 B2
(45) Date of Patent: Feb. 27, 2018

(54) APPARATUS AND METHOD FOR DETECTING A GENERATION POINT OF PASSIVE INTERMODULATION

(71) Applicant: ELECTRONICS AND TELECOMMUNICATIONS RESEARCH INSTITUTE, Daejeon (KR)

(72) Inventors: Kyu Min Kang, Daejeon (KR); Seung Keun Park, Daejeon (KR); Jae Cheol Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/356,397

(22) Filed: Nov. 18, 2016

(65) Prior Publication Data

US 2017/0149463 A1 May 25, 2017

(30) Foreign Application Priority Data

Nov. 20, 2015 (KR) ........................ 10-2015-0162934

(51) Int. Cl.
H04B 1/10 (2006.01)
H04W 24/08 (2009.01)
H04L 27/26 (2006.01)

(52) U.S. Cl.
CPC ......... *H04B 1/1027* (2013.01); *H04L 27/265* (2013.01); *H04W 24/08* (2013.01)

(58) Field of Classification Search
CPC ........ H04B 1/1027; H04B 1/10; H04B 1/123; H04B 3/46; H04B 17/0085; H04B 17/103; H04B 17/14; H04B 17/17; H04B 17/19; H04B 1/40; H04B 17/104; H04B 17/309; H04B 15/00; H04B 17/29; H04B 1/0466;

(Continued)

(56) References Cited

U.S. PATENT DOCUMENTS 8,629,671 B1 1/2014 Bradley
8,760,148 B1 6/2014 Bradley (Continued)

FOREIGN PATENT DOCUMENTS

KR 10-2002-0039409 A 5/2002
KR 10-0765721 B1 10/2007

(Continued)

OTHER PUBLICATIONS

Fabien Millioz et al., "Sparse Detection in the Chirplet Transform: Application to FMCW Radar Signals", IEEE Transactions on Signal Processing, Jun. 2012, pp. 2800-2813, vol. 60, No. 6, IEEE.

(Continued)

*Primary Examiner* — Philip Sobutka (57) ABSTRACT

The present disclosure provides apparatuses or methods for detecting a PIM generation point, which can enhance the accuracy of the PIM generation point detection up to a level of 10 centimeters, and thus enable rapid replacement or maintenance of a disfunctional element causing the PIM by installing and controlling a time delay module in an output end of a reference signal (or, a PIM signal) for detection of the PIM generation point.

14 Claims, 6 Drawing Sheets

(58) Field of Classification Search
CPC . H04B 3/00; H04B 3/28; H04B 3/462; H04B 3/466; H04L 27/265; H04W 24/08
USPC ..... 455/501, 63.1, 67.13, 67.14, 67.16, 296, 455/310
See application file for complete search history.

(56) References Cited

U.S. PATENT DOCUMENTS

| | | | | |
|---|---|---|---|---|
| 8,903,324 | B1* | 12/2014 | Bradley | H04B 17/27 455/67.11 |
| 2006/0248564 | A1* | 11/2006 | Zinevitch | H04N 17/00 725/121 |
| 2014/0119197 | A1* | 5/2014 | Maca | H04B 17/0085 370/241 |
| 2017/0230129 | A1* | 8/2017 | Yoo | H04J 11/0023 |

FOREIGN PATENT DOCUMENTS

| | | |
|---|---|---|
| KR | 10-1136994 B1 | 4/2012 |
| KR | 10-1361678 B1 | 2/2014 |

OTHER PUBLICATIONS

Graham S. Woods et al., "A High Accuracy Microwave Ranging System for Industrial Applications", IEEE Transactions on Instrumentation and Measurement, Aug. 1993, pp. 812-816, vol. 42, No. 4, IEEE.

* cited by examiner

APPARATUS AND METHOD FOR DETECTING A GENERATION POINT OF PASSIVE INTERMODULATION

CLAIM FOR PRIORITY

This application claims priority to Korean Patent Application No. 10-2015-0162934 filed on November 20, 2015 in the Korean Intellectual Property Office (KIPO), the entire contents of which are hereby incorporated by reference.

BACKGROUND

1. Technical Field

The present disclosure relates to methods and apparatuses for finding out a generation point of a passive intermodulation (PIM), and more particularly, to methods and apparatuses for rapidly and correctly finding out a generation point of PIM.

2. Related Art

According to the current increase of demands for mobile networks and wireless data services, foreign or domestic mobile communication operators make efforts to secure more frequency bands and construct efficient mobile networks enabling multi-band services. Due to the high construction cost and maintenance cost, it's not practically easy to install and operate respective in-building feeders for multiple frequency bands. Thus, cases using a common in-building feeder to provide services through various frequency bands are increasing currently.

However, in the case that a common feeder is used to provide multi-band services in a building, a passive intermodulation (PIM) may occur, thereby causing interferences between upward channel and downward channel, and thus reducing a service range and deteriorating telephone connection efficiencies. Since the PIM may occur due to contact inferiority caused by deterioration of passive elements such as cable connectors, multiplexers, and circulators, the disfunctional elements should be replaced or repaired in order to solve the problem of PIM. Also, since the in-building feeders are laid in the ceiling or wall, a PIM generation point should be correctly estimated in order to promptly replace or repair the disfunctional elements.

For this, conventional PIM generation point detection apparatuses estimate a PIM generation point approximately by determining, through a digital signal processing, a beat frequency according to a time delay between a reference signal generated utilizing a Frequency Modulation Continuous Wave (FMCW) signal and a Continuous Wave (CW) signal, and a PIM signal returned after being inputted to an input end of the in-building feeder. However, since the conventional PIM generation point detection apparatuses have accuracy of several meters, several candidate PIM generation points may be estimated, whereby the replacement or repair of the disfunctional elements take too much time.

SUMMARY

Accordingly, example embodiments of the present disclosure are provided to substantially obviate one or more problems due to limitations and disadvantages of the related art.

Example embodiments of the present disclosure provide apparatuses or methods for detecting a PIM generation point, which can enhance the accuracy of the PIM generation point detection up to a level of 10 centimeters, and thus enable rapid replacement or maintenance of a disfunctional element causing the PIM by installing and controlling a time delay module in an output end of a reference signal (or, a PIM signal) for detection of the PIM generation point.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides an apparatus for detecting a passive intermodulation (PIM) generation point, comprising a time delay module configured to delay, according to a time delay amount control value, a reference signal based on a frequency modulation continuous wave (FMCW) signal and a continuous wave (CW) signal, or a PIM signal output from an in-building feeder; a time delay control module configured to generate the time delay amount control value according to a control command; and a control part configured to generate the control command, and calculate a PIM generation point based on the time delay amount control value and a signal processing result obtained by performing a Fast Fourier Transform (FFT) on a beat frequency signal based on a signal which is delayed by the time delay module among the PIM signal and the reference signal and the other signal which is not delayed signal among the PIM signal and the reference signal.

The control part may be configured to check a beat frequency difference according to the signal processing result and calculate a fine scanning power value in an unit frequency band of the beat frequency having a power value not less than a first threshold based on power values according to the signal processing result, in order to use a principle that a PIM signal level to the PIM generation point varies according to the signal processing result, and a distance to the PIM generation point varies according to an amount of the time delay of the PIM signal from the PIM generation point.

Here, a frequency of the reference signal is $2*f_1 - f_2$, $f_1$ is a frequency of the FMCW signal, and $f_2$ is a frequency of the CW signal. Also, the beat frequency signal comprises an in-phase (I) signal and a quadrature-phase (Q) signal.

Also, the apparatus may further comprise an I/Q demodulator generating the I signal and the Q signal, and a low pass filter (LPF), a signal level adjustor, an analog-to-digital converter (ADC), and a signal processor for the FFT which are sequentially coupled to the I/Q demodulator.

The control part may be configured to calculate power values of respective unit frequency bands for the signal processing result; control the time delay module to generate the signal which is delayed by a predetermined amount ($\Delta$) according to the control command in an unit frequency band k having a power value not less than a first threshold belonging to a total frequency band; and calculate the PIM generation point based on k and i satisfying an equation $$\left( \max\left[ \frac{P_{B(k-\Delta*i)}}{\min(P_{B(j)}, j=1, 2, \dots K)} \right] \geq Th2, (i=0, 1, \dots, M-1) \right),$$

wherein $P_{B(k-\Delta*i)}$ is a power value at i-th sub-unit (i=1, 2, ..., M−1, M is a natural number) in the unit frequency band k, Th2 is a second threshold, $P_{B(j)}$ is a power value of an unit frequency band j (j=1, 2, ..., K, K is a natural number, and a total frequency band is divided into K unit frequency bands).

The control part may be configured to calculate the PIM generation point by checking whether the equation is satisfied by other unit frequency bands after finding the k and i and updating the k and i.

In order to achieve the above-described objective, another aspect of the present disclosure provides a method for detecting a passive intermodulation (PIM) generation point, comprising generating a time delay amount control value according to a control command; delaying, according to the time delay amount control value, a reference signal based on a frequency modulation continuous wave (FMCW) signal and a continuous wave (CW) signal, or a PIM signal output from an in-building feeder; and calculating a PIM generation point based on the time delay amount control value and a signal processing result obtained by performing a Fast Fourier Transform (FFT) on a beat frequency signal based on a signal which is delayed by the time delay module among the PIM signal and the reference signal and the other signal which is not delayed signal among the PIM signal and the reference signal.

In the calculating the PIM generation point, the PIM generation point may be calculated by checking a beat frequency difference according to the signal processing result and calculating a fine scanning power value in an unit frequency band of the beat frequency having a power value not less than a first threshold based on power values according to the signal processing result, in order to use a principle that a PIM signal level to the PIM generation point varies according to the signal processing result, and a distance to the PIM generation point varies according to an amount of the time delay of the PIM signal from the PIM generation point.

Here, a frequency of the reference signal is $2*f_1-f_2$, $f_1$ is a frequency of the FMCW signal, and $f_2$ is a frequency of the CW signal. Also, the beat frequency signal comprises an in-phase (I) signal and a quadrature-phase (Q) signal.

In the calculating the PIM generation point, the signal processing result may be output by an FQ demodulator generating the I signal and the Q signal, and a low pass filter (LPF), a signal level adjustor, an analog-to-digital converter (ADC), and a signal processor for the FFT which are sequentially coupled to the I/Q demodulator.

The calculating the PIM generation point may further comprise calculating power values of respective unit frequency bands for the signal processing result; controlling the time delay module to generate the signal which is delayed by a predetermined amount ($\Delta$) according to the control command in an unit frequency band k having a power value not less than a first threshold belonging to a total frequency band; and calculating the PIM generation point based on k and i satisfying an equation $$\left( \max\left[ \frac{P_{B(k-\Delta*i)}}{\min(P_{B(j)},\ j=1,2,\ldots K)} \right] \geq Th2,\ (i=0,1,\ldots,M-1) \right),$$

wherein $P_{B(k-\Delta*i)}$ is a power value at i-th sub-unit (i=1, 2, ..., M−1, M is a natural number) in the unit frequency band k, Th2 is a second threshold, $P_{B(j)}$ is a power value of an unit frequency band j (j=1, 2, ..., K, K is a natural number, and a total frequency band is divided into K unit frequency bands).

The PIM generation point may be calculated by checking whether the equation is satisfied by other unit frequency bands after finding the k and i and updating the k and i.

Using a PIM generation point detection apparatus and method according to the present disclosure, the time delay module is introduced in the output end of the reference signal (or, the PIM signal), and thus the reference signal can be controlled so that the detection accuracy of the PIM generation point can be enhanced up to a level of 10 centimeters. Also, since the detection accuracy of the PIM generation point is remarkably enhanced, the time required to replace or repair the disfunctional element causing the PIM signal can be reduced and thus maintenance cost for the in-building feeder network can be decreased. Also, the mobile service range or the efficiency of telephone connection can be enhanced by rapidly resolving the problem caused by the PIM.

BRIEF DESCRIPTION OF DRAWINGS

Example embodiments of the present disclosure will become more apparent by describing in detail example embodiments of the present disclosure with reference to the accompanying drawings, in which.

DESCRIPTION OF EXAMPLE EMBODIMENTS

Hereinafter, some exemplary embodiments of the present disclosure will be described in detail with reference to the accompanying drawings. When reference numerals refer to elements of each drawing, it is noted that although the same elements are illustrated in different drawings, the same elements are referred to by the same reference numerals as possible. Further, in describing the exemplary embodiments of the present disclosure, when it is determined that the detailed description of known configurations or functions related to the present disclosure may obscure the understanding of the exemplary embodiment of the present disclosure, the detailed description thereof will be omitted.

In describing constituent elements of the exemplary embodiment of the present disclosure, terms such as first, second, A, B, (a), (b), and the like may be used. Such a term is only for discriminating the constituent element from another constituent element, and does not limit the essential feature, order, or sequence of the constituent element, or the like. Further, if it is not contrarily defined, all terms used herein including technological or scientific terms have the same meaning as those generally understood by those skilled in the art. Terms which are defined in a generally used dictionary should be interpreted to have the same meaning as the meaning in the context of the related art but are not interpreted as ideal or excessively formal meaning if it is not clearly defined in the present disclosure.

Figure 1:
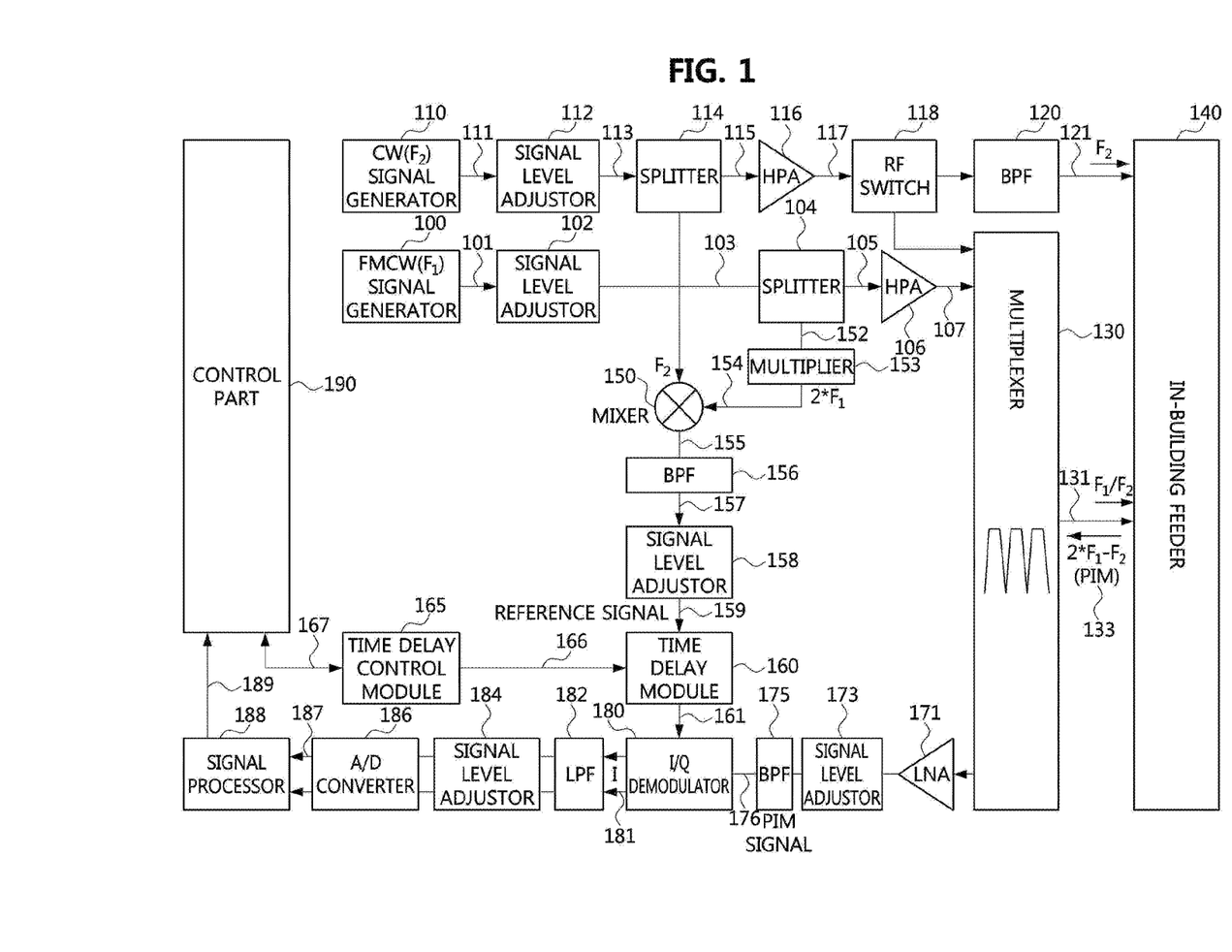
FIG. 1 is a block diagram of a PIM generation point detection apparatus according to an exemplary embodiment of the present disclosure.

FIG. 1 is a block diagram of a PIM generation point detection apparatus according to an exemplary embodiment of the present disclosure.

Referring to FIG. 1, an PIM generation point detection apparatus 200 according to an exemplary embodiment of the present disclosure may comprise a control part 190, a frequency modulation continuous wave (FMCW) signal ($f_1$) generator 100, a signal level adjustor 102, a high power amplifier (HPA) 106, a frequency multiplier 153, a continuous wave (CW) signal ($f_2$) generator 110, a signal level adjustor 112, a splitter 114, a HPA 116, a mixer 151, a multiplexer 130, an in-building feeder 140, a radio frequency (RF) switch 118, a band pass filter (BPF) 120, a time delay module 160, a time delay control module 165, a low noise amplifier (LNA) 171, a signal level adjustor 173, a BPF 175, an I/Q demodulator 180, a low pass filter (LPF) 182, a signal level adjustor 184, an analog-to-digital converter (ADC) 186, and a signal processor 188.

The control part 190 may be implemented with a semiconductor processor such as a micro controller unit (MCU), and responsible for overall control on the above-described respective components of the PIM generation point detection apparatus 200. Also, the control part 190 may be implemented as including at least one of the above-described components.

The FMCW signal ($f_1$) generator 100 may generate a FMCW signal by using a direct digital synthesizer (DDS), etc., and generate a signal having a frequency $f_1$ (i.e., a FMCW ($f_1$) signal 101) through a frequency multiplier.

The FMCW ($f_1$) signal 101 generated at the FMCW signal generator 100 may be amplified or attenuated by the signal level adjustor 102, and transferred to the splitter 104. Then, signals 105 and 152 output from the splitter 104 may be transferred respectively to the HPA 106 and the multiplier 153.

The CW ($f_2$) signal generator 110 may generate a signal having a frequency $f_2$ (i.e., a CW ($f_2$) signal 111) which is phase-locked to a reference clock of an oscillator such as an oven controlled crystal oscillator by using a frequency synthesizer.

The CW ($f_2$) signal 111 generated at the CW ($f_2$) signal generator 110 may be amplified or attenuated by the signal level adjustor 112, and divided by the splitter 114. Signals 115 and 151 output from the splitter 114 may be transferred respectively to the HPA 116 and the mixer 151.

A first signal 107 having a frequency $f_1$ amplified by the HPA 106 may be output to the in-building feeder 140 through the multiplexer 130 and an input terminal 131.

The RF switch 118 may selectively use one or two output ports. In the case that the RF switch 118 uses a signal output port, the RF switch 118 may transmit a second signal 117 having a frequency $f_2$ amplified by the HPA 116 to the multiplexer 130 under control of the control part 190, and the multiplexer 130 may input the second signal 117 to the in-building feeder 140 through the input terminal 131. In the case that the RF switch 118 uses two output ports, the RF switch 118 may transmit the second signal 117 to the BPF 120 under control of the control part 190, and the BPF 120 may output the processed signal to the in-building feeder 140 through an input terminal 121.

In order to detect a PIM signal, a reference signal for detecting the PIM signal, which has a frequency ($2*f_1-f_2$), is needed. For this, a signal 154 having a frequency ($2*f_1$) that the multiplier 153 generates by frequency multiplication and a signal 151 having a frequency $f_2$ output by the splitter 114 may pass through the mixer 150, the BFP 156, and the signal level adjustor (signal level amplification or attenuation) 158, whereby a reference signal 159 for detecting a PIM generation point is generated. The generated reference signal 159 may have a frequency of $2*f_1-f_2$. For example, when an operation frequency band of the first signal based on the FMCW ($f_1$) signal generator 100 has a range of 2145 MHz to 2170 MHz, and a frequency of the second signal based on the CM ($f_2$) signal generator 110 is 2.34 GHz, the reference signal 159 may be a FMCW signal operating in a frequency band of 1950 MHz to 2000 MHz. For ease of understanding, hereinafter, the FMCW signal is assumed to be a signal operating in a frequency band of 1950 MHz to 2000 MHz.

Also, in the present disclosure, the time delay module 160 and the time delay control module 165 may be additionally used at the output ends of the reference signal 159 so that a time delay of the reference signal 159 can be controlled by unit of a nanosecond and thus a detection accuracy of the PIM generation point can be enhanced up to a level of 10 centimeter.

After the signals 107 and 117 are inputted to the in-building feeder 140 through the input terminal 131, a PIM signal 133 returning through a downward channel of the feeder 140 may be inputted to the LNA 171 in a receive path through the multiplexer 130. Then, after the PIM signal 133 passes through the signal level adjustor 173 (signal level amplification or attenuation of signal) and the BPF 175, only a PIM signal 176 having a frequency ($2*f_1-f_2$) in a frequency band 1950 MHz to 2000 MHz remains. For reference, if necessary, the time delay module 160 proposed in the present disclosure may also be installed behind the BPF 175 located in a PIM signal path, that is, between the IQ demodulator 180 and the BPF 175.

A signal 161 which is obtained at the time delay module 160 by delaying the above-described reference signal 159 according to a time delay amount control value 166 of the time delay control module 165, and the PIM signal 176 are inputted to the I/Q demodulator 180, and the FQ demodulator 180 may generate corresponding beat frequency signal 181 comprising corresponding in-phase (I) signals and quadrature-phase (Q) signals.

Then, the beat frequency signal 181 may sequentially pass through the LPF 182 and the signal level adjustor 184 (signal level amplification or attenuation), and be inputted to the signal processor 188 through the ADC 186. Since the beat frequency signal 187 having passed through the ADC 186 has information on a distance to the PIM generation point and a PIM signal level, the information may be converted into information on a PIM signal level by a distance to the PIM generation point through a Fast Fourier Transform signal processing (refer to FIG. 6).

Using this, the control part 190 may finally determine the PIM generation point (e.g. a position of an element which is an origin of the PIM signal, such as a cable connector, a multiplexer, and a circulator) based on the FFT signal processing result 189 and the control value 167 of the time delay control module 165.

Figure 2:
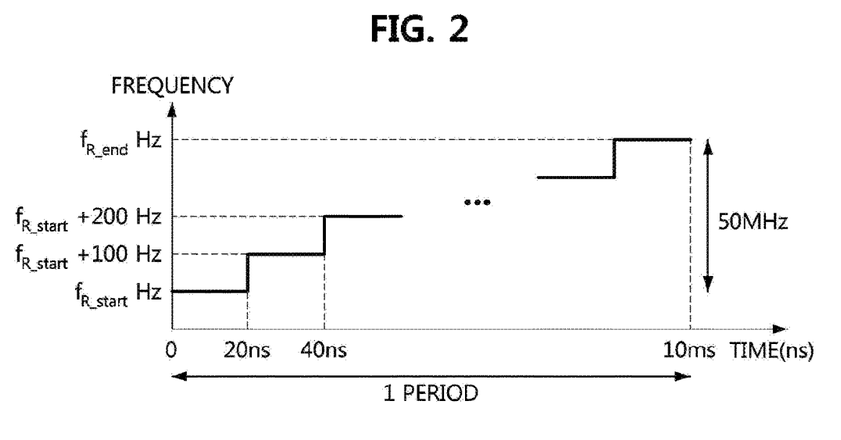
FIG. 2 is an exemplary view of a reference signal according to an exemplary embodiment of the present disclosure.

FIG. 2 is an exemplary view of a reference signal according to an exemplary embodiment of the present disclosure.

The signal 154 having a frequency ($2*f_1$) which has been generated by the FMCW signal generator 100, divided by the splitter 104, and outputted from the multiplier 153, and the signal 151 having a frequency of $f_2$ which has been generated by the CW signal generator 110, and outputted from the splitter 114 respectively pass through the mixer 150, the BPF 156, and the signal level adjustor 158, whereby the reference signal 159 for detection of a PMI signal generation point can be generated as illustrated in FIG. 2.

For example, the reference signal 159 may have a frequency in a range of $f_{R\_start}$ to $f_{R\_end}$ Hz. That is, the operating frequency of the reference signal 159 may start from $f_{R\_start}$ and increase by a predetermined value (e.g. 100 Hz) every 20 ns (nanoseconds). For example, when it is assumed that the operating frequency range of the first signal 152 is 2145~2170 MHz and the frequency of the second signal is 2.34 GHz, the reference signal 159 may become a FMCW signal operating in a frequency range of 1950~2000 MHz.

Figure 3:
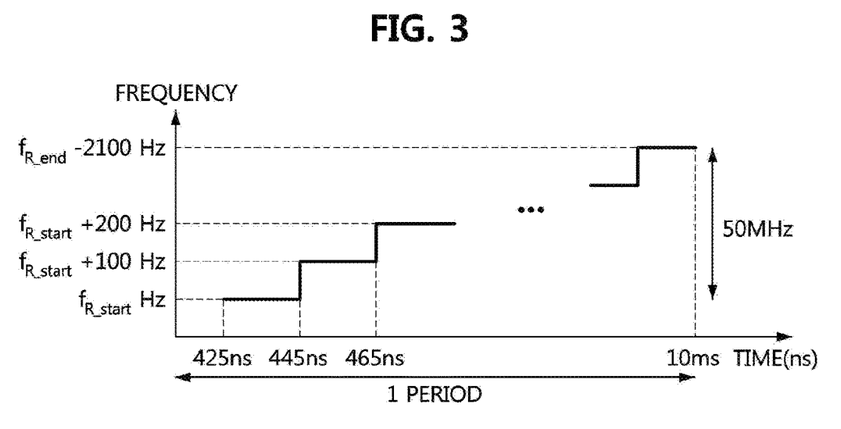
FIG. 3 is an exemplary view of a PIM signal generated in a feeder according to an exemplary embodiment of the present disclosure.

FIG. 3 is an exemplary view of a PIM signal generated in a feeder according to an exemplary embodiment of the present disclosure.

For example, after the PIM signal generated at the in-building feeder 140, as a signal delayed by 425 ns as compared with the reference signal 159, is transmitted to the multiplexer 130 through the downward channel 133, and passes through the LNA 171, the signal level adjustor 173, and the BPF 175, the PIM signal observed at a point of 176 may be represented as shown in FIG. 3.

Figure 4:
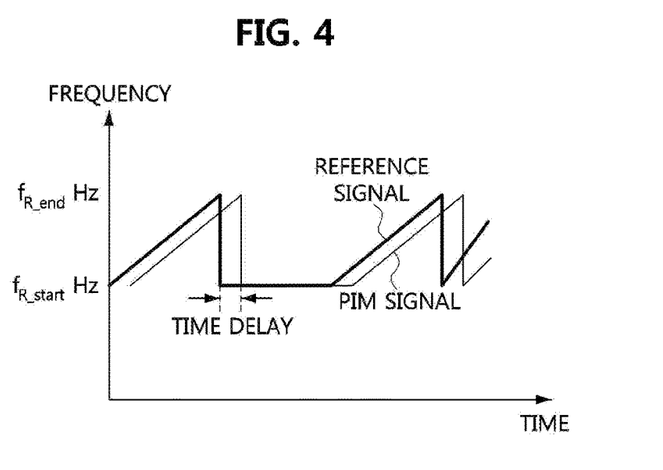
FIG. 4 is a concept diagram to explain a time delay between the reference signal 159 and the PIM signal 176 generated at the feeder according to an exemplary embodiment of the present disclosure.

FIG. 4 is a concept diagram to explain a time delay between the reference signal 159 and the PIM signal 176 generated at the feeder according to an exemplary embodiment of the present disclosure.

Figure 5:
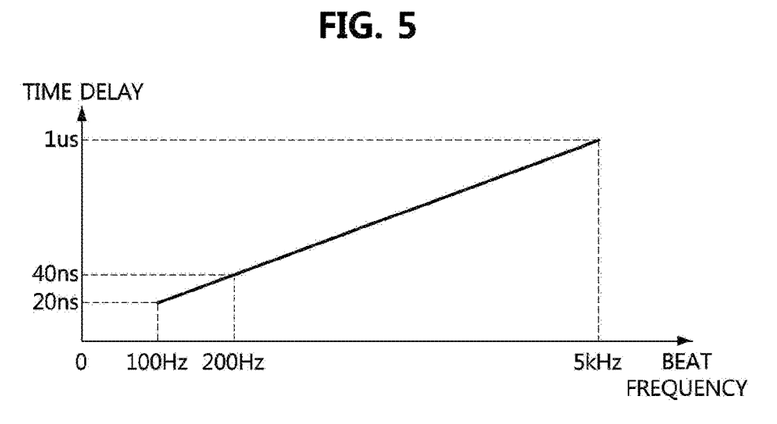
FIG. 5 is an exemplary view to explain a relation between a time delay between a reference signal and a PIM signal generated at a feeder, and a beat frequency of a beat frequency signal, according to an exemplary embodiment of the present disclosure.

As illustrated in FIG. 4, in the case that a time delay exists between the reference signal 159 and the PIM signal 176 generated at the feeder, differences may vary between frequencies of the two signals by lapse of time. That is, FIG. 5 illustrates a relation between a frequency of a beat frequency signal 187 and the time delay between the reference signal 159 and the PIM signal 176.

Figure 6:
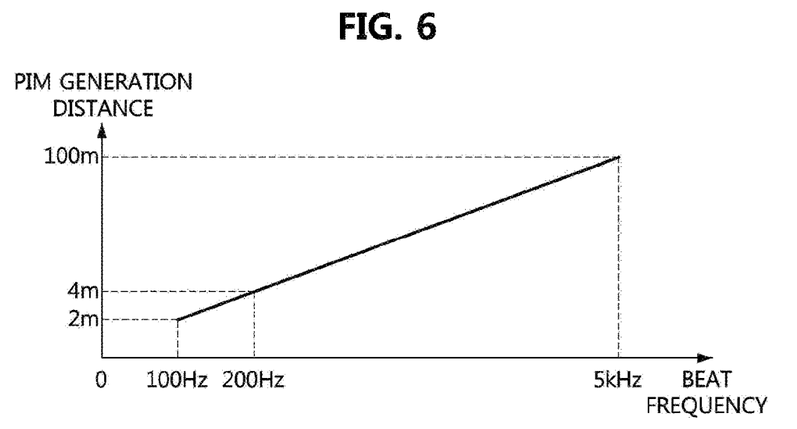
FIG. 6 is an exemplary view to explain distances between a PIM generation point detection apparatus and a PIM generation point, which are estimated based on frequencies of a beat frequency signal.

Meanwhile, FIG. 6 is an exemplary view to explain distances between the PIM generation point detection apparatus and the PIM generation point, which are estimated based on the frequency of the beat frequency signal 187. In FIG. 6, a dielectric constant of the in-building feeder 140 is assumed to be 1.5. Since the distance to the PIM generation point calculated based on the beat frequency may vary according to the dielectric constant of the feeder 140, the dielectric constant of the feeder should be accurately measured and used for estimating the distance of the PIM generation point. Like this, based on a principle that the PIM signal level to the PIM generation point may vary according to a result of FFT on the beat frequency signal, and the distance to the PIM generation point may also vary to the amount of the time delay of the PIM signal 176 from the PIM generation point, the PIM generation point can be estimated.

Figure 7:
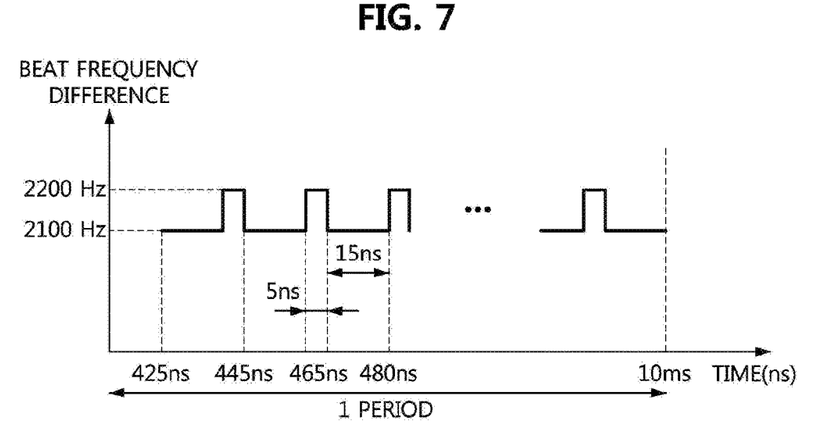
FIG. 7 is an exemplary view to illustrate a beat frequency difference according to the time delay between a reference signal of FIG. 2 and a PIM signal of FIG. 3.

FIG. 7 is an exemplary view to illustrate a beat frequency difference according to the time delay between the reference signal 159 of FIG. 2 and the PIM signal 176 of FIG. 3.

A signal illustrated in FIG. 7 may correspond to an analog signal output obtained by inputting the reference signal 159 and the PIM signal 176 to the I/Q demodulator 180, generating the beat frequency signal 181, and making the beat frequency signal 181 pass through the LPF 182 and the signal level adjustor 184. As shown in FIG. 7, since the time delay between the reference signal 159 and the PIM signal 176 (e.g. 25 ns) is not an integer multiple of 20 ns, the beat frequency difference may not be constant. That is, a signal according to a beat frequency difference of 2200 Hz may be repeatedly output during 5 ns periods, and a signal according to a beat frequency difference of 2100 Hz may be repeatedly output during 15 ns periods. In the case that the signal having such the beat frequency difference passes through the ADC 186, and the FFT is performed on the signal in the signal processor 188, an error may exist in the detected PIM signal generation point. For example, a beat frequency error up to 100 Hz (corresponding to a distance error of about 2 meters when the dielectric constant of the in-building feeder is assumed to be 1.5) may be generated.

In order to resolve the above-described problem, according to an exemplary embodiment of the present disclosure, the time delay module 160 may be located at the output end of the reference signal 159 (or, the output end of the PIM signal 176), and the time delay control module 165 may be configured to control the time delay of the reference signal 159 (or, the PIM signal 176) in unit of 1 ns.

Figure 8:
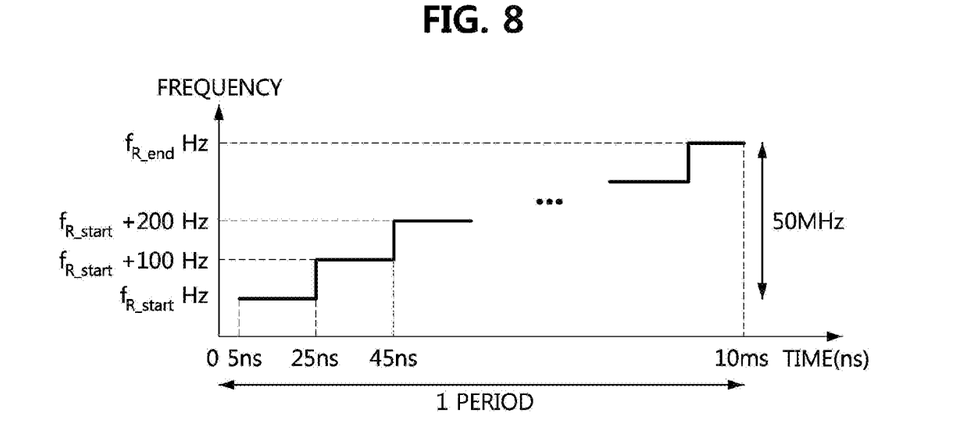
FIG. 8 is an exemplary view to illustrate a wave form obtained by delaying the reference signal by 5 ns through a time delay module according to an exemplary embodiment of the present disclosure.
Figure 9:
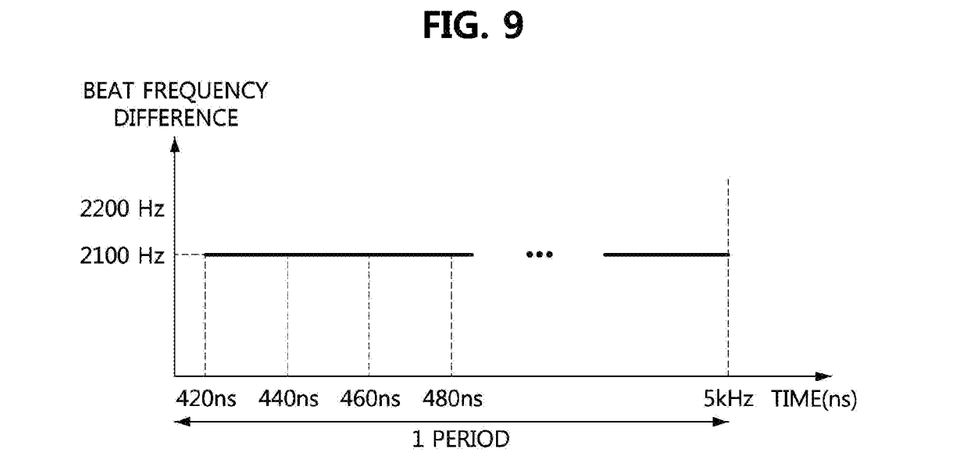
FIG. 9 is an exemplary view of beat frequency differences according to a time delay between a delayed reference signal of FIG. 8 and a PIM signal generated at a feeder of FIG. 3.

FIG. 8 is an exemplary view to illustrate a wave form obtained by delaying the reference signal by 5 ns through the time delay module 160 according to an exemplary embodiment of the present disclosure. Also, FIG. 9 is an exemplary view of beat frequency differences according to the time delay between the delayed reference signal of FIG. 8 and the PIM signal generated at the feeder of FIG. 3.

As illustrated in FIG. 8, since the time delay between the reference signal 159 delayed by 5 ns and the PIM signal 176 (e.g. 20 ns) is an integer multiple of 20 ns, the beat frequency difference may be maintained constantly as 2100 Hz. Also, since the time delay of the reference signal may be controlled by the time delay control module 160 in unit of 1 ns, when FFT is performed on the output signal of the ADC 186 corresponding to the beat frequency difference, the detection accuracy of the PIM generation point may be remarkably enhanced to a level of 10 centimeter. As described above, if necessary, the time delay control module 160 may also be located between the I/Q demodulator 180 and the BPF 175. The time delay control module 165 may generate a time delay control value for delaying the PIM signal 176 or the reference signal 159.

Hereinafter, referring to a flow chart of FIG. 10, a PIM generation point detection procedure performed by a PIM generation point detection apparatus 200 according to an exemplary embodiment of the present disclosure will be explained in detail.

Figure 10:
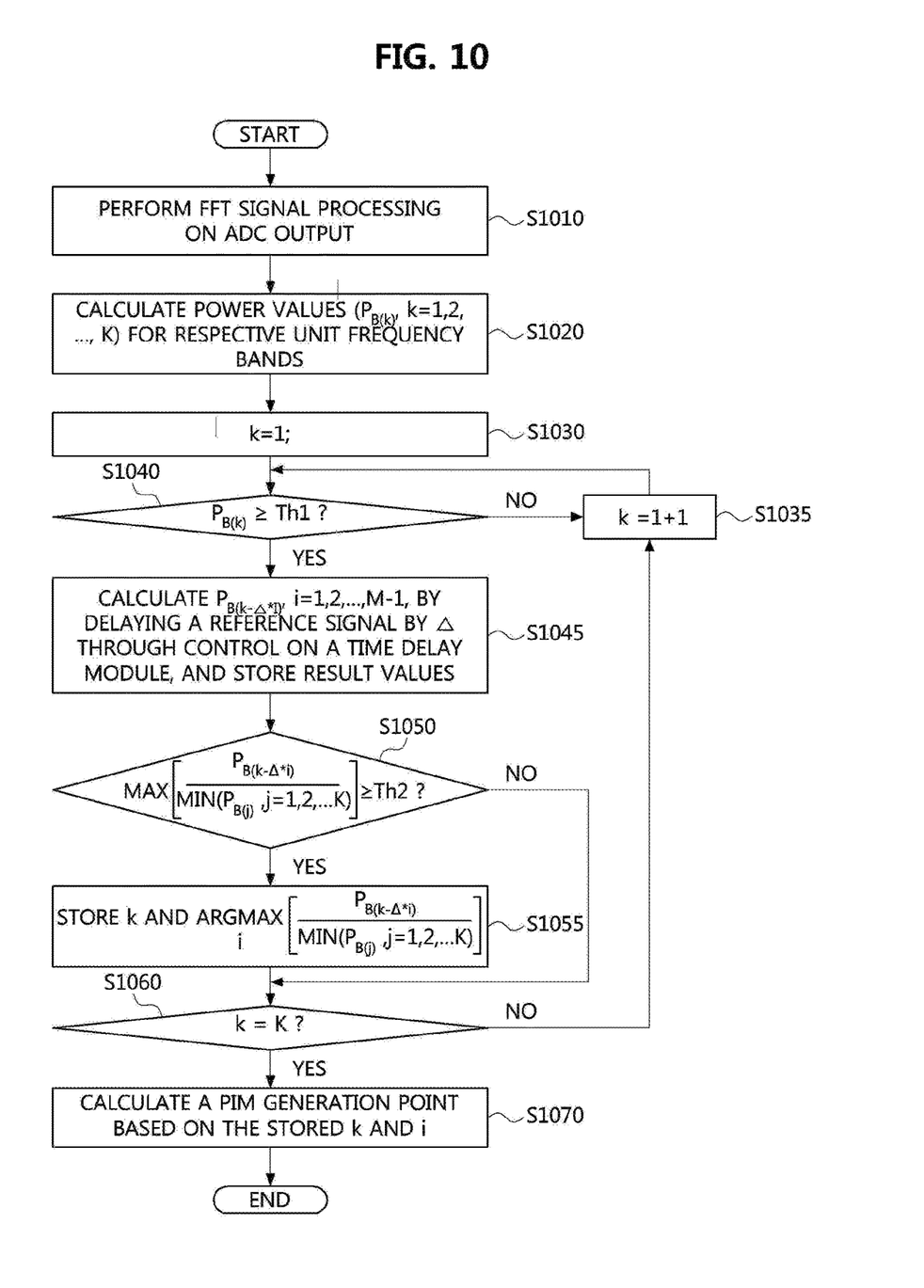
FIG. 10 is a flow chart to explain an operation of a PIM generation point detection apparatus according to an exemplary embodiment of the present disclosure.

FIG. 10 is a flow chart to explain an operation of a PIM generation point detection apparatus according to an exemplary embodiment of the present disclosure.

Figure 11:
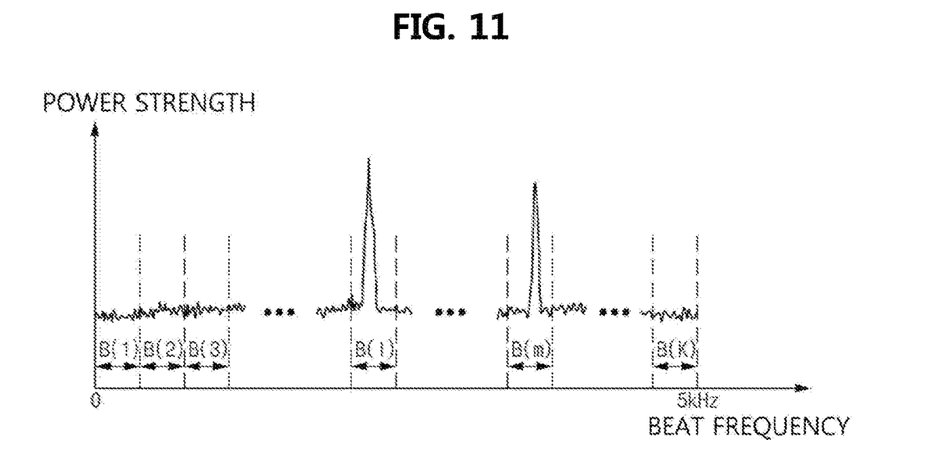
FIG. 11 is an exemplary view to explain unit frequency bands according to an exemplary embodiment of the present disclosure.

First, the signal processor 188 of the PIM generation point detection apparatus 200 may perform a FFT signal processing on an output of the ADC 186 (S1010). Here, the control part 190 may calculate K power values for K (K is a natural number) respective unit frequency bands, and store them in a storage means such as a memory (S1020). For reference, in the case illustrated in FIG. 9, a width of each unit frequency band may be 100 Hz, the number of unit frequency bands may be 50, and a time delay for each unit frequency band may be 20 ns. The unit frequency bands can be illustrated in FIG. 11, and the power value for respective unit frequency bands $P_{B(k)}$ may be represented as the following equation 1.

$$P_{B(k)}, k=1,2, \ldots, K \qquad \text{[Equation 1]}$$

Then, the control part 190 may check whether the respective $P_{B(k)}$ is not less than a first threshold Th1 sequentially from k=1 (S1030, S1040). If the $P_{B(k)}$ is less than Th1, the k is increased (S1035) and the step S1040 is repeated. IF the $P_{B(k)}$ is not less than Th1, the next step S1045 may be performed.

The control part 190 may generate a control command instructing the time delay control module 167 to generate a time delay amount control value 166. Accordingly, the time delay module 165 may perform scanning to delay the reference signal 159 (or, the PIM signal 176) by Δ (e.g. 1 ns) for i=1, 2, . . . , M−1 (here, Δ=1/M, and M is a natural number) by controlling delay elements at the corresponding k, and the control part 190 may calculate respective power values ($P_{B(k-\Delta *i)}$ (i=1,2, . . . , M−1) at i-th sub-unit which is sequentially scanned at the corresponding k-th unit frequency band for the FFT result of the signal processor 188, and temporarily store the result values in the storage means such as memory. Then, the control part 190 may check whether the following equation 2 is satisfied or not based on a second threshold Th2 (S1050).

$$\max\left[\frac{P_{B(k-\Delta *i)}}{\min(P_{B(j)}, j = 1, 2, \ldots K)}\right] \geq Th2, \qquad \text{[Equation 2]}$$
$$(i = 0, 1, \ldots, M-1)$$

If the above equation is satisfied, the control part 190 may store the corresponding k and i in the storage means (S1055). On the contrary, the control part 190 may directly perform the step S1060 without storing the values.

Then, the control part 190 may check whether k is K (S1060). If k is not K, the control part 190 may increase k by 1 (S1035), and repeat the steps S1040 to S1060. If k is K, the control part 190 may detect a PIM generation point from the k and i stored in the storage means (S1070), and finalize the PIM generation point detection procedure. That is, even after k and is are found out, k and i may be updated while it is checked whether the equation 2 is satisfied for the rest of unit frequency bands up to K-th unit frequency band belonging to the total frequency band. Then, the PIM generation point may be calculated based on the final k and i. The case that the k and i are updated may be understood as a case that the time delay of the reference signal 159 and the PIM signal 176 exists and a beat frequency difference exists as illustrated in FIG. 7.

The control part 190 may use a predetermined function or a lookup table, which may be a basis for calculation of a PIM generation point based on a beat frequency of the beat frequency signal 187 as shown in FIG. 6, to calculate a PIM generation distance corresponding to i at the stored k, and output information on a PIM generation point. Such the calculation of the PIM generation point is using the principle that the PIM signal level to the PIM generation point may vary according to a result of FFT on the beat frequency signal, and the distance to the PIM generation point may also vary according to the amount of the time delay of the PIM signal 176 from the PIM generation point. For this, the beat frequency difference according to the FFT result may be checked, and a fine scanning power value (a power value at i) for a unit frequency band k of the beat frequency having a power not less than Th1 may be calculated based on the power value of FFT result as represented in the equation 2, and thus the detection accuracy of the PIM generation point can be enhanced.

Through utilization of the suggested time delay module, the PIM reference signal 159 (or, the PIM signal 176) can be controlled so that the detection performance of the PIM generation point in the in-building feeder 140 can be remarkably enhanced.

As described above, in the PIM generation point detection apparatus 200 according to the present disclosure, the time delay module 160 is introduced in the output end of the reference signal 159 (or, the PIM signal), and thus the reference signal can be controlled so that the detection accuracy of the PIM generation point can be enhanced up to a level of 10 centimeters. Also, since the detection accuracy of the PIM generation point is remarkably enhanced, the time required to replace or repair the disfunctional element causing the PIM signal can be reduced and thus maintenance cost for the in-building feeder network can be decreased. Also, the mobile service range or the efficiency of telephone connection can be enhanced by rapidly resolving the problem caused by the PIM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Accordingly, the exemplary embodiments disclosed herein are not intended to limit the technical spirit but describe the technical spirit of the present disclosure, and the scope of the technical spirit of the present disclosure is not limited by the exemplary embodiment. The scope of the present disclosure should be construed based on the following appended claims and it should be appreciated that the technical spirit included within the scope equivalent to the claims belongs to the scope of the present disclosure.

What is claimed is:

1. An apparatus for detecting a passive intermodulation (PIM) generation point, comprising:
   a circuit configured to receive a pair of signals, the circuit comprising:
      a time delay module configured to delay, according to a time delay amount control value, a first signal of the pair of signals to produce a delayed signal, and
      a demodulator circuit configured to produce a beat frequency signal according to the delayed signal and a second signal of the pair of signals,
      the first signal of the pair of signals being different than the second signal of the pair of signals, and the pair of signals being:
         a reference signal based on a frequency modulation continuous wave (FMCW) signal and a continuous wave (CW) signal, and
         a PIM signal output from an in-building feeder;
   a time delay control module configured to generate the time delay amount control value according to a control command; and
   a control part configured to generate the control command, and calculate a PIM generation point based on the time delay amount control value and a signal processing result obtained by performing a Fast Fourier Transform (FFT) on the beat frequency signal.

2. The apparatus according to claim 1, wherein the control part is configured to check a beat frequency difference according to the signal processing result and calculate a fine scanning power value in an unit frequency band of the beat frequency having a power value not less than a first threshold based on power values according to the signal processing result, in order to use a principle that a PIM signal level to the PIM generation point varies according to the signal processing result, and a distance to the PIM generation point varies according to an amount of the time delay of the PIM signal from the PIM generation point.

3. The apparatus according to claim 1, wherein a frequency of the reference signal is $2*f_1-f_2$, $f_1$ is a frequency of the FMCW signal, and $f_2$ is a frequency of the CW signal.

4. The apparatus according to claim 1, wherein the beat frequency signal comprises an in-phase (I) signal and a quadrature-phase (Q) signal.

5. The apparatus according to claim 4, further comprising an I/Q demodulator generating the I signal and the Q signal, a low pass filter (LPF), a signal level adjustor, an analog-to-digital converter (ADC), and a signal processor for the FFT which are sequentially coupled to the I/Q demodulator.

6. The apparatus according to claim 1, wherein the control part is configured to:
calculate power values of respective unit frequency bands for the signal processing result;
control the time delay module to generate the delayed signal which is delayed by a predetermined amount ($\Delta$) according to the control command in an unit frequency band k having a power value not less than a first threshold belonging to a total frequency band; and
calculate the PIM generation point based on k and i satisfying an equation $$\left(\max\left[\frac{P_{B(k-\Delta*i)}}{\min(P_{B(j)}, j=1, 2, \ldots K)}\right] \geq Th2, (i=0, 1, \ldots, M-1)\right),$$

wherein $P_{B(k-\Delta*i)}$ is a power value at i-th sub-unit (i=1, 2, ..., M−1, M is a natural number) in the unit frequency band k, Th2 is a second threshold, $P_{B(j)}$ is a power value of an unit frequency band j (j=1, 2, ..., K, K is a natural number, and a total frequency band is divided into K unit frequency bands).

7. The apparatus according to claim 6, wherein the control part is configured to calculate the PIM generation point by checking whether the equation is satisfied by other unit frequency bands after finding the k and i and updating the k and i.

8. A method for detecting a passive intermodulation (PIM) generation point, comprising:
generating a time delay amount control value according to a control command;
delaying, according to the time delay amount control value, a first signal of a pair of signals to produce a delayed signal,
generating, using the delayed signal and a second signal of the pair of signals to produce a beat frequency signal; and calculating a PIM generation point based on the time delay amount control value and a signal processing result obtained by performing a Fast Fourier Transform (FFT) on the beat frequency signal,
wherein the pair of signals includes a PIM signal output from an in-building feeder and a reference signal based on a frequency modulation continuous wave (FMCW) signal and a continuous wave (CW) signal, and
wherein the first signal is different from the second signal.

9. The method according to claim 8, wherein, in the calculating the PIM generation point, the PIM generation point is calculated by checking a beat frequency difference according to the signal processing result and calculating a fine scanning power value in an unit frequency band of the beat frequency having a power value not less than a first threshold based on power values according to the signal processing result, in order to use a principle that a PIM signal level to the PIM generation point varies according to the signal processing result, and a distance to the PIM generation point varies according to an amount of the time delay of the PIM signal from the PIM generation point.

10. The method according to claim 8, wherein a frequency of the reference signal is $2*f_1-f_2$, $f_1$ is a frequency of the FMCW signal, and $f_2$ is a frequency of the CW signal.

11. The method according to claim 8, wherein the beat frequency signal comprises an in-phase (I) signal and a quadrature-phase (Q) signal.

12. The method according to claim 11, wherein, in the calculating the PIM generation point, the signal processing result is output by an I/Q demodulator generating the I signal and the Q signal, and a low pass filter (LPF), a signal level adjustor, an analog-to-digital converter (ADC), and a signal processor for the FFT which are sequentially coupled to the I/Q demodulator.

13. The method according to claim 8, wherein the calculating the PIM generation point further comprises:
calculating power values of respective unit frequency bands for the signal processing result;
controlling the time delay module to generate the delayed signal which is delayed by a predetermined amount ($\Delta$) according to the control command in an unit frequency band k having a power value not less than a first threshold belonging to a total frequency band; and
calculating the PIM generation point based on k and i satisfying an equation $$\left(\max\left[\frac{P_{B(k-\Delta*i)}}{\min(P_{B(j)}, j=1, 2, \ldots K)}\right] \geq Th2, (i=0, 1, \ldots, M-1)\right),$$

wherein $P_{B(k-\Delta*i)}$ is a power value at i-th sub-unit (i=1, 2, ..., M−1, M is a natural number) in the unit frequency band k, Th2 is a second threshold, $P_{B(j)}$ is a power value of an unit frequency band j (j=1, 2, ..., K, K is a natural number, and a total frequency band is divided into K unit frequency bands).

14. The method according to claim 13, wherein the PIM generation point is calculated by checking whether the equation is satisfied by other unit frequency bands after finding the k and i and updating the k and i.

* * * * *